(12) United States Patent
Soun

(10) Patent No.: US 6,928,940 B2
(45) Date of Patent: Aug. 16, 2005

(54) DEVICE FOR THE SELECTIVE METERING OF SEED AND ADDITIVES INTENDED FOR SOWING AND IMPROVING SOILS

(75) Inventor: Jean-Yves Soun, Saint Laurent d'Aigouze (FR)

(73) Assignee: Vaillance S.A., Luxembourg (LU)

(*) Notice: Subject to any disclaimer, the term of this patent is extended or adjusted under 35 U.S.C. 154(b) by 0 days.

(21) Appl. No.: 10/766,447

(22) Filed: Jan. 27, 2004

(65) Prior Publication Data

US 2004/0216655 A1 Nov. 4, 2004

(51) Int. Cl.$^7$ .............................. A01C 7/00; A01C 9/00

(52) U.S. Cl. ...................................................... 111/178

(58) Field of Search .................... 111/177–185, 170; 221/211

(56) References Cited

U.S. PATENT DOCUMENTS

| | | |
|---|---|---|
| 1,573,493 A | 6/1926 | Heyd |
| 2,042,133 A | 5/1936 | Underwood |

*Primary Examiner*—Christopher J. Novosad
(74) *Attorney, Agent, or Firm*—Sturm & Fix LLP

(57) ABSTRACT

The invention concerns a device for the selective metering of seed intended essentially for sowing and/or reseeding soils and of additives intended essentially for improving and/or treating the soils; said device comprising essentially:

a) a hopper (1) intended to contain the seed or the said additives;

b) a unit for the selective metering (2, 3, 4) of the seed or of the additives originating from the said hopper;

c) a mechanism (5, 6) for transferring the seed or the additives originating from the metering unit, into furrows created in the soil by means of a scarification unit provided with a plurality of discs (7);

wherein the unit for the selective metering of the seed and additives originating from the hopper comprises in combination:

a) a selective metering roll (2) comprising, longitudinally, a plurality of successive zones (Z) each subdivided into at least two zones (Z1) and (Z2) provided with means (2A), (2B) and (2C) suitable for metering the seed or the additives according to their particle size;

b) a mechanism (3) comprising a plurality of openings (3A), separated by solid parts (3B), suitable, by the lateral movement of the mechanism (3), for making the seed or additives originating from the hopper (1) communicate either with the zone (Z1), or with the zone (Z2);

c) a mechanism (4) comprising a plurality of openings (4A), separated by solid parts (4B), suitable, by the lateral movement of the mechanism (4), for blocking off, to a greater or lesser extent, the openings (3A) of the mechanism (3).

21 Claims, 4 Drawing Sheets

DEVICE FOR THE SELECTIVE METERING OF SEED AND ADDITIVES INTENDED FOR SOWING AND IMPROVING SOILS

CROSS REFERENCE TO RELATED APPLICATIONS

This application claims priority of French Application No. 03800881 filed Jan. 27, 2003, which is included in its entirety by reference made hereto.

BACKGROUND OF THE INVENTION

1. Field of the Invention
2. Description

The invention concerns a device for the selective metering of seed intended essentially for sowing and/or reseeding soils and of additives intended essentially for improving (fertilizers) and/or treating (pesticides) soils.

The areas to which the device according to the invention relates are:

sowing, which is an operation undertaken after preparation of the soil (ploughing or other);

reseeding, or direct seeding, which is an operation undertaken to compensate, either for a natural mortality of the vegetation mat, or for a mortality caused by a contact herbicide treatment, without soil preparation;

reseeding which is an operation that consists in incorporating new grasses into an existing lawn;

improvement or treatment of the soil by dressing with very specific additives.

The potential users of the device according to the invention are:

service providers such as landscape gardeners, regenerators of grassed sports grounds, equipment rental companies;

operators of golf courses and race courses;

departments responsible for the maintenance of parks and gardens of local authorities;

seed growers and cooperatives for grassing down vineyards and orchards.

BRIEF SUMMARY OF THE INVENTION

The objectives which the device according to the invention aims to achieve are:

to combine in the same device the means relating to the operations of sowing, resowing, reseeding, improvement and treatment of soils by granular, powder and even liquid additives by spraying;

to provide an apparatus capable of adapting equally well to a golf green (springy and extremely delicate ground) as to a race course (large, more rustic surface area mowed to a height of 8 to 10 cm);

to obtain a device that is quickly and easily manoeuvrable, having little friction on the soil, usable on surfaces containing obstacles (sprinklers, stones and other), able to be adjusted to suit the working width (for example from 70 cm to 3.50 metres) by the juxtaposition of basic modules, with very little wear, usable in all types of weather.

The basic modules comprising the device according to the invention are essentially:

a hopper intended to contain the seed or the additives;
a unit for the selective metering of the seed or of the additives originating from the said hopper;

means of transferring the seed or the additives originating from the said metering unit, into the furrows created in the soil by means of a scarification unit provided with a plurality of discs.

They are essentially characterized in that the unit for the selective metering of the seed and additives originating from the hopper comprises in combination:

a) a selective metering roll comprising, longitudinally, a plurality of successive zones each subdivided into at least two zones provided with means suitable for metering the seed or the additives according to their particle size;

b) a first means comprising a plurality of openings, separated by solid parts, suitable, by the lateral movement of the said means, for making the seed or additives originating from the hopper communicate either with the first zone, or with the second zone;

c) a second means comprising a plurality of openings, separated by solid parts, suitable, by the lateral movement of the said second means, for blocking off, to a greater or lesser extent, the openings of the first means.

They are also characterized in that the means for the transfer of the seed or of the additives originating from the metering unit into the furrows made in the soil by the scarification unit consist of a funnel fitted with a tube linked to a hollow sowing finger.

The features and advantages of the invention will appear more clearly on reading the detailed description that follows of at least one preferred embodiment of the invention given as a non-limiting example and represented in the appended drawings.

DETAILED DESCRIPTION OF THE INVENTION

Figure 1:
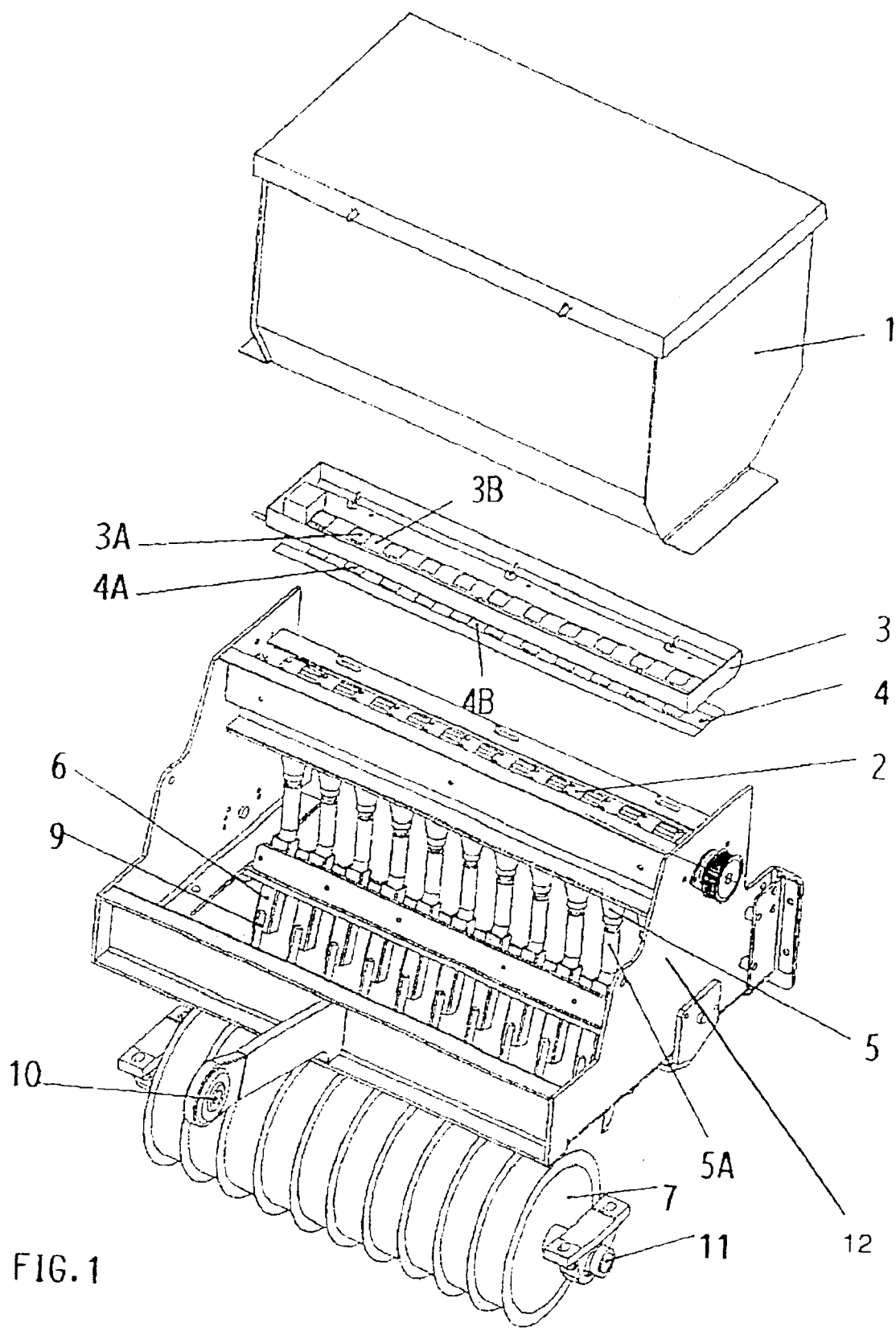
FIG. 1 is an exploded view, in perspective, of the various subassemblies of the device according to the invention.
Figure 2:
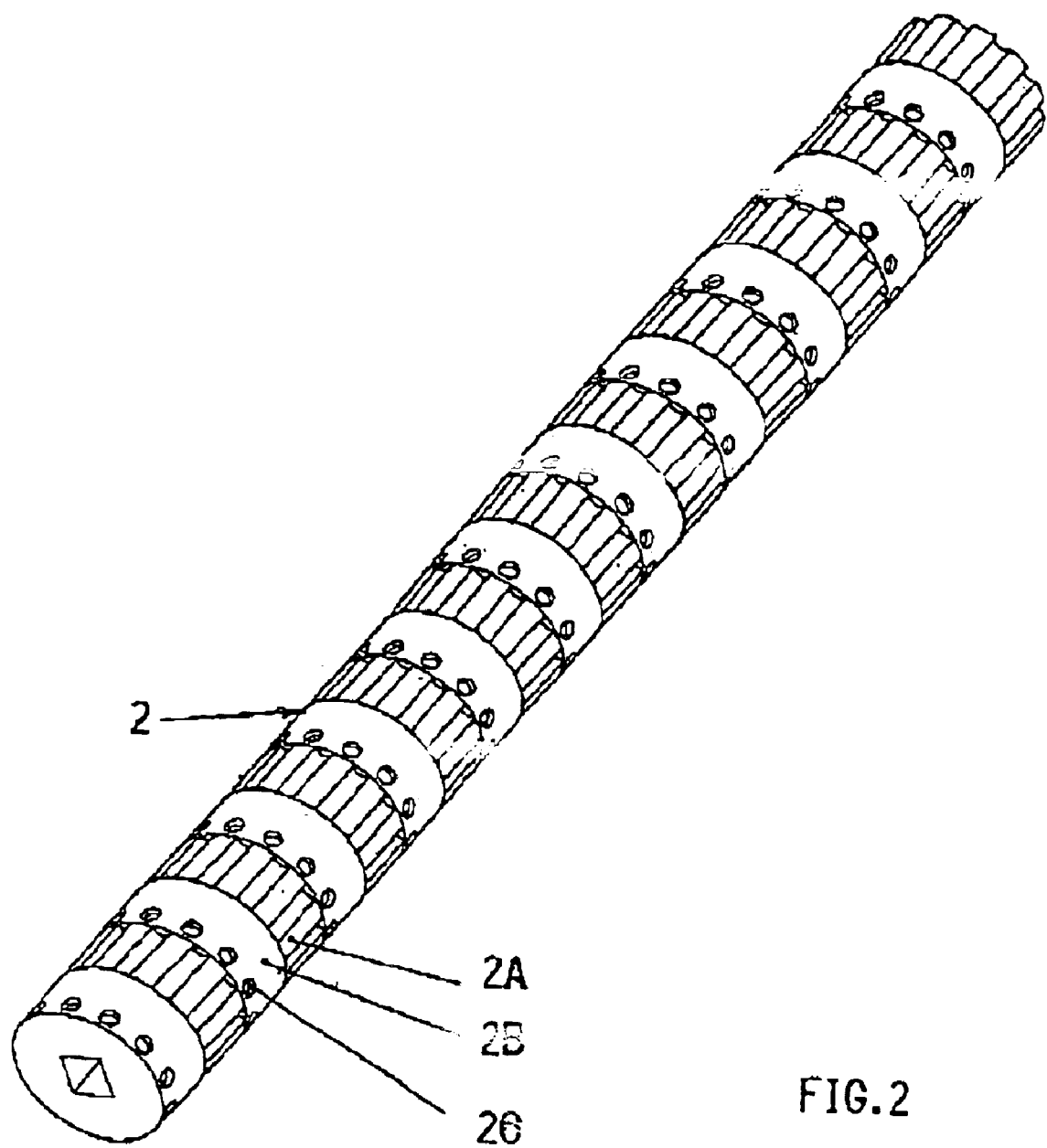
FIG. 2 is a detail view, in perspective, of the distribution roll.
Figure 3:
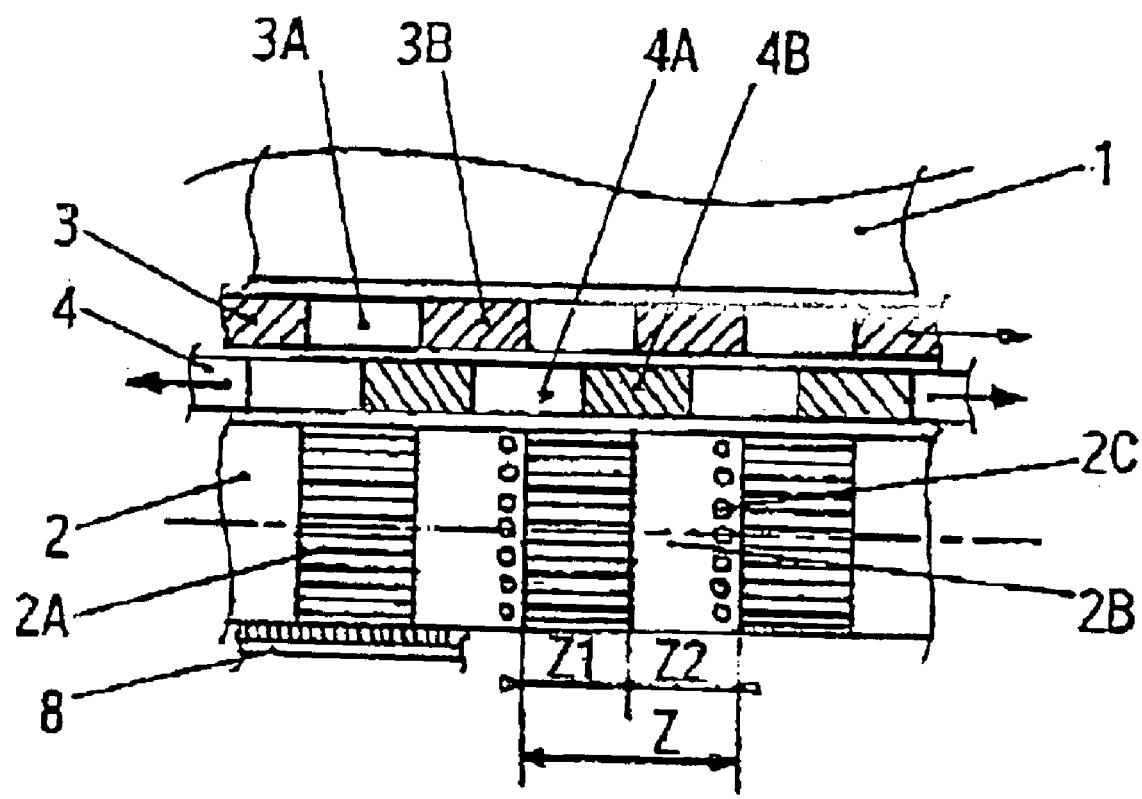
FIG. 3 is a partial view, in longitudinal section, of the preceding first and second means associated with the distribution roll and the collection funnel.
Figure 4:
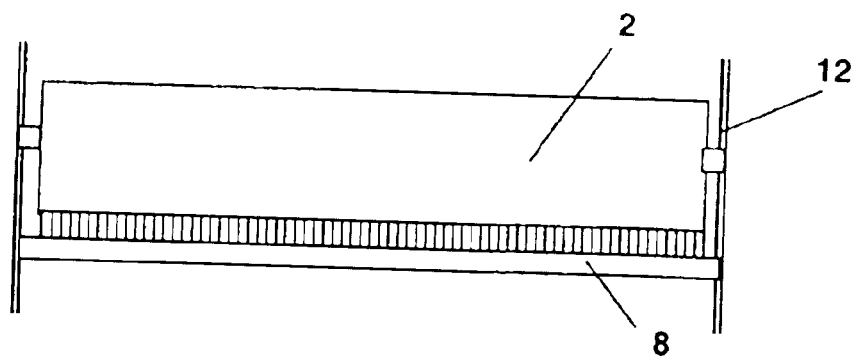
FIG. 4 schematically represents framing, and the selective metering roll and the means of a sweeping brush type.
Figure 5:
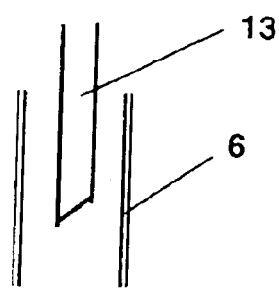
FIG. 5 schematically represents a capillary tube comprised in hollow finger suitable for transferring liquid additives as close as possible to the furrows.
Figure 6:
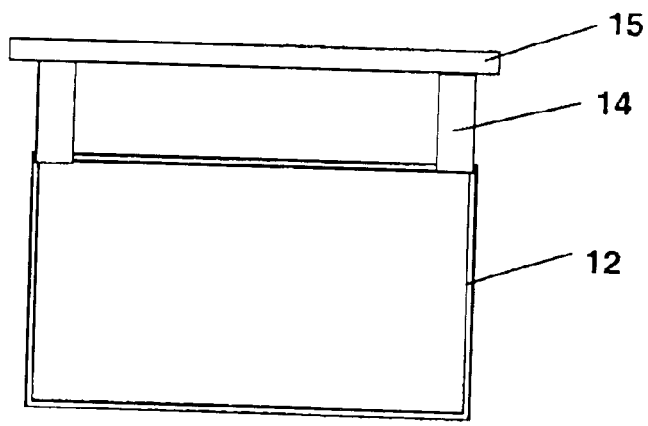
FIG. 6 schematically represents framing carrying the selective metering unit which is linked to the carrying and pulling machine by means of a hydropneumatic suspension.

The device for the selective metering of seed and additives, represented in the figures, comprises essentially:

a) a hopper (1) intended to contain the said seed or the said additives;

b) a unit for the selective metering (2, 3, 4) of the seed or of the additives originating from the said hopper;

c) means (5, 6) of transferring the seed or the additives originating from the said metering unit, into furrows created in the soil by means of a scarification unit provided with a plurality of discs (7).

The unit for the selective metering of the seed and additives originating from the hopper comprises in combination:

a) a selective metering roll (2) comprising, longitudinally, a plurality of successive zones (Z) each subdivided into at least two zones (Z1) and (Z2) provided with means (2A), (2B) and (2C) suitable for metering the seed or the additives according to their particle size;

b) a means (3) comprising a plurality of openings (3A), separated by solid parts (3B), suitable, by the lateral movement of the said means (3) relative to metering roll (2), for making the seed or additives originating from the hopper (1) communicate either with the zone (Z1), or with the zone (Z2);

c) a means (4) comprising a plurality of openings (4A), separated by solid parts (4B), suitable, by the lateral movement of the said means (4) relative to said means (3), for blocking off, to a greater or lesser extent the openings (3A) of the means (3).

According to the particularities of implementation of the roll (2):

the means (2A) consists of axial flutes (2A) disposed on the periphery of the entire width of the zone (Z1): they are designed to carry the seeds of large dimensions (particle size in the order of 500 to 700 seeds per gram) and to meter up to 50 g/m$^2$ of seeds and up to 120 g/m$^2$ of fertilizers or coated improvers;

the means (2B) consists of the smooth external casing, of the roll (2), which occupies a part of the width of the zone (Z2) and at least the part of the said roll concerned by the said casing is made out of dielectric material charged with static electric particles by the rubbing, during the rotation of the roll (2), of a means (8), of the sweeping brush type: it is designed to carry, by electrostatic effect, fine seeds (particle size of the order of 18 000 to 23 000 seeds per gram) and to obtain a minimum metering of the order of 0.25 g/m$^2$;

the means (2C) consists of spot facings formed on the periphery of the part of the width of the zone (Z2) not occupied by the means (2B): it is designed to carry medium-size, round seeds (particle size of the order of 2500 seeds per gram).

The means for the transfer of the seed or of the additives originating from the metering unit into the furrows made in the soil by the scarification unit consist of a funnel (5) fitted with a tube (5A), preferably flexible and transparent linked to a hollow sowing finger (6).

Each hollow sowing finger (6) comprises:

a hollow sliding extension the travel of which is suitable to enable its bottom extremity to transfer the seed or the additives as near a s possible to the furrows;

an arm (9) suitable for parting the grass on either side of the furrows.

sliding capillary tubes suitable for transferring liquid additives as close as possible to the furrows.

The capillary tubes are supplied by solenoid valves controlled by a throughput computer.

The speed of rotation of the distribution roll (2) is controlled by the speed of forward travel of the machine carrying and pulling the set of elements constituting the metering device. The distribution is called "forced" and is proportional to the speed of forward travel.

The set of elements constituting the metering device is linked to the carrying and pulling machine by means of a hydropneumatic suspension.

The device in question also comprises:

a link arm (10) for attachment to the hitch points;

a shaft (11), carrying the discs (7) of the scarifier, driving the roll (2).

One and the same machine may carry, and therefore pull, several devices according to the invention in order to cover a multiple surface area.

For example, for a basic module 70 cm wide, a tool-carrier suitable for supporting up to five modules can cover a width of 3.50 m.

Naturally the invention is not restricted to the embodiments described and represented for which other variants may be envisaged, particularly in the design, the number and dimensions of the openings of the means (3) and (4), of the means of sorting and of metering (2A), (2B) and (2C), of the means of transfer (6, 7) and it may be extended to other applications.

What is claimed is:

1. Device for the selective metering of seed intended essentially for sowing or reseeding soils and of additives intended essentially for improving and/or treating the soils; said device comprising:

a) a hopper (1) for holding the seed or the additives or both;

b) a unit for the selective metering (2, 3 and 4) of the seed or of the additives or both originating from the hopper;

c) means (5 and 6), for transferring the seed or the additives or both originating from the metering unit into furrows created in the soil by means of a scarification unit provided with a plurality of discs (7);

wherein the unit for the selective metering of the seed and additives originating from the hopper (1) comprises:

a) a selective metering roll (2) comprising, longitudinally, a plurality of successive zones (Z), each zone being subdivided into at least two zones (Z1 and Z2) and provided with means (2A, 2B and 2C), suitable for metering the seed or the additives according to their particle size;

b) a means (3) comprising a plurality of openings (3A) separated by solid parts, suitable by the lateral movement of said means (3) relative to metering roll (2) for making the seed or additives originating from the hopper (1) communicate either with the zone (Z1) or with the zone (Z2);

c) a means (4), comprising a plurality of openings separated by solid parts, suitable by the lateral movement of said means (4) relative to said means (3) for blocking off to a greater or lesser extent, the openings (3A) of the means (3).

2. Device according to claim 1, wherein one of the means of the unit for selective metering comprises axial flutes (2A) disposed on the periphery of the entire width of the zone (Z1).

3. Device according to claim 2, wherein the set of elements comprising the selective metering unit is linked to the carrying and pulling machine (15) by means of a hydropneumatic suspension (14).

4. Device according to claim 1, wherein means (2B) comprises a smooth external casing of the roll (2) which occupies a part of the width of the zone (Z2) and in that at least the part of the said roll concerned by the casing is made out of dielectric material charged with electric particles due to rubbing during the rotation of the roll (2) of a sweeping brush means (8).

5. Device according to claim 4 wherein means (2C) comprises spot facings formed on the periphery of the part of the width of the zone (Z2) not occupied by the means (2B).

6. Device according to claim 5, wherein the set of elements comprising the selective metering unit is linked to the carrying and pulling machine (15) by means of a hydropneumatic suspension (14).

7. Device according to claim 4, wherein the set of elements comprising the selective metering unit is linked to the carrying and pulling machine (15) by means of a hydropneumatic suspension (14).

8. Device according to claim 1 wherein means (2C) comprises spot facings formed on the periphery of the part of the width of the zone (Z2) not occupied by the means (2B).

9. Device according to claim 8, wherein the set of elements comprising the selective metering unit is linked to the carrying and pulling machine (15) by means of a hydropneumatic suspension (14).

10. Device according to claim 1, wherein the means for the transfer of the seed or of the additives originating from the metering unit, into the furrows made in the soil by the scarification unit, comprise a funnel (5) fitted with a tube (5A) linked to a hollow sowing finger (6).

11. Device according to claim 10, wherein each hollow sowing finger (6) comprises a hollow sliding extension the travel of which is suitable to enable its bottom extremity to transfer the seed or the additives as near as possible to the furrows.

12. Device according to claim 11, wherein the set of elements comprising the selective metering unit is linked to the carrying and pulling machine (15) by means of a hydropneumatic suspension (14).

13. Device according to claim 10, wherein each hollow sowing finger (6) comprises an arm (9) suitable for parting the grass on either side of the furrows.

14. Device according to claim 13, wherein the set of elements comprising the selective metering unit is linked to the carrying and pulling machine (15) by means of a hydropneumatic suspension (14).

15. Device according to claim 10, wherein each hollow sowing finger (6) comprises sliding capillary tubes (13) suitable for transferring liquid additives as close as possible to the furrows.

16. Device according to claim 15, wherein the set of elements comprising the selective metering unit is linked to the carrying and pulling machine (15) by means of a hydropneumatic suspension (14).

17. Device according to claim 10, wherein the set of elements comprising the selective metering unit is linked to the carrying and pulling machine (15) by means of a hydropneumatic suspension (14).

18. Device according to claim 1, wherein the speed of rotation of the distribution roll (2) is controlled by the speed of forward travel of the machine carrying and pulling a set of elements comprising the selective metering unit.

19. Device according to claim 18, wherein the set elements comprising the selective metering unit is linked to the carrying and pulling machine (15) by means of a hydropneumatic suspension (14).

20. Device according to claim 1, wherein the set of elements comprising the selective metering unit is linked to the carrying and pulling machine (15) by means of a hydropneumatic suspension (14).

21. Device according to claim 1, wherein the set of elements comprising the selective metering unit is linked to the carrying and pulling machine (15) by means of a hydropneumatic suspension (14).

\* \* \* \* \*